June 28, 1938.  C. H. SCOTT  2,122,384
SEDIMENTATION APPARATUS
Filed April 25, 1936  9 Sheets-Sheet 1

Inventor
CHARLES H. SCOTT

Attorney

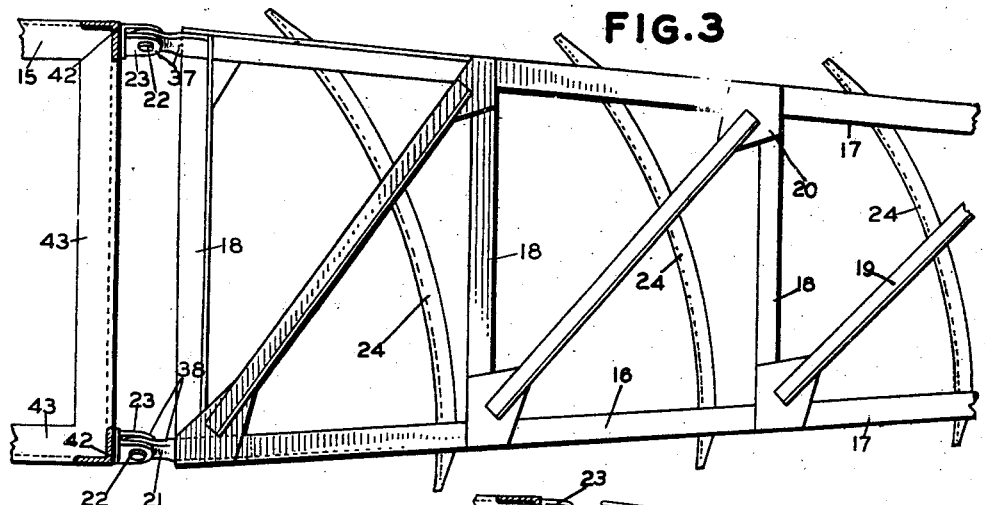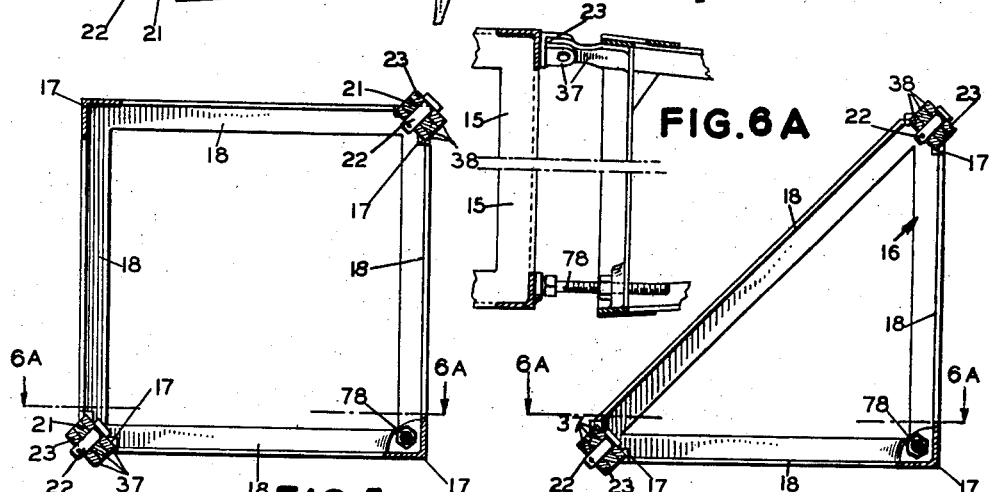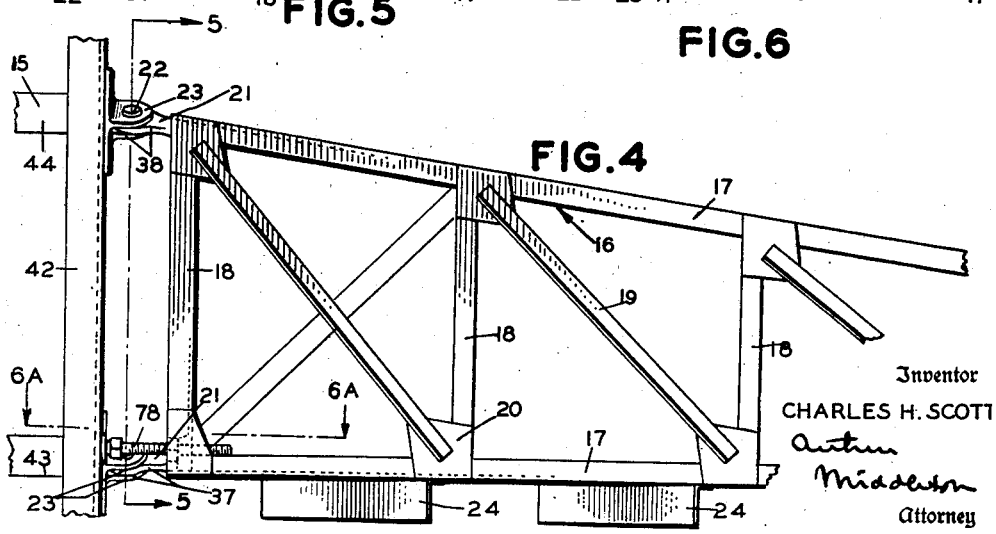

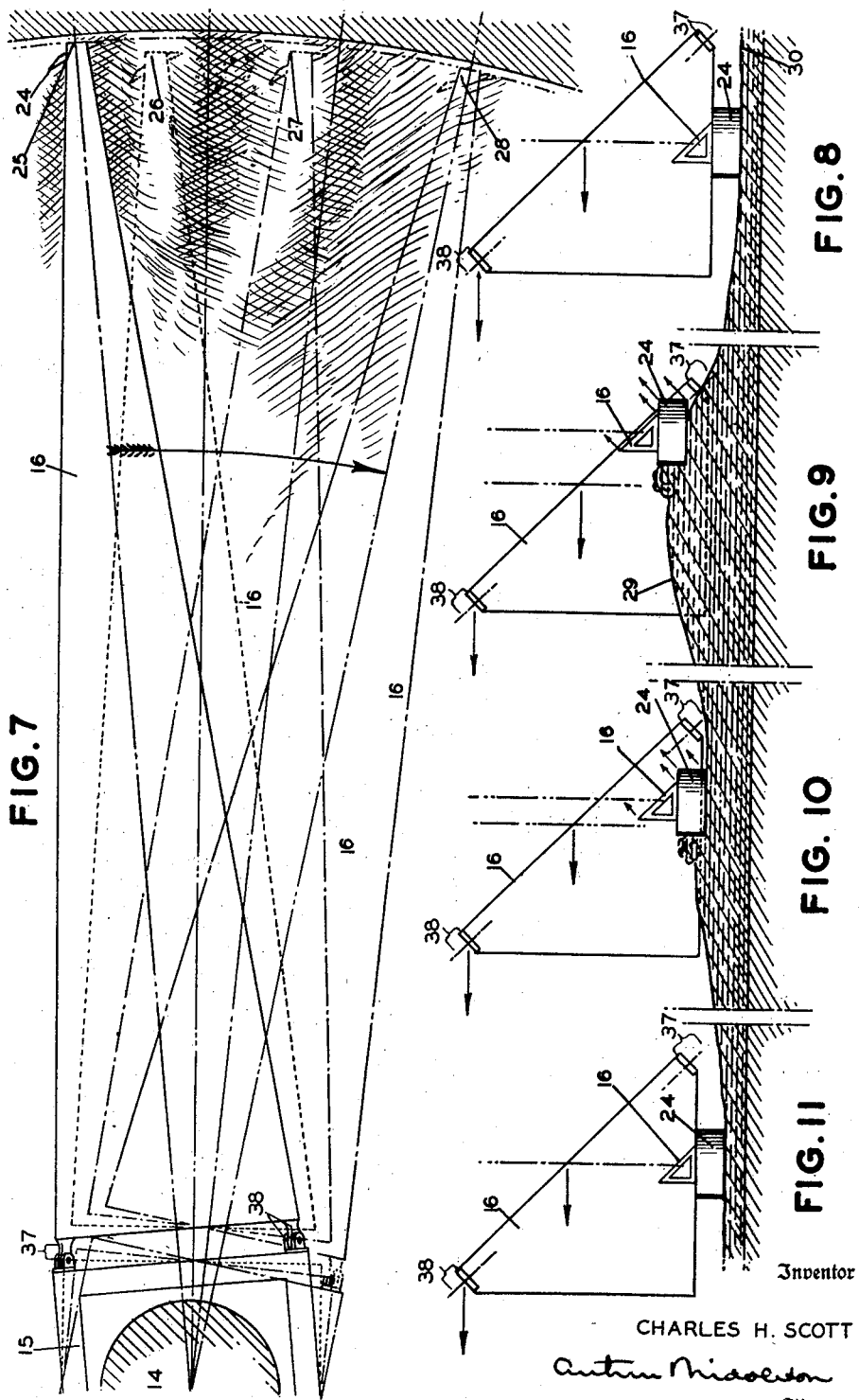
June 28, 1938.  C. H. SCOTT  2,122,384
SEDIMENTATION APPARATUS
Filed April 25, 1936   9 Sheets-Sheet 3
Inventor
CHARLES H. SCOTT
Attorney

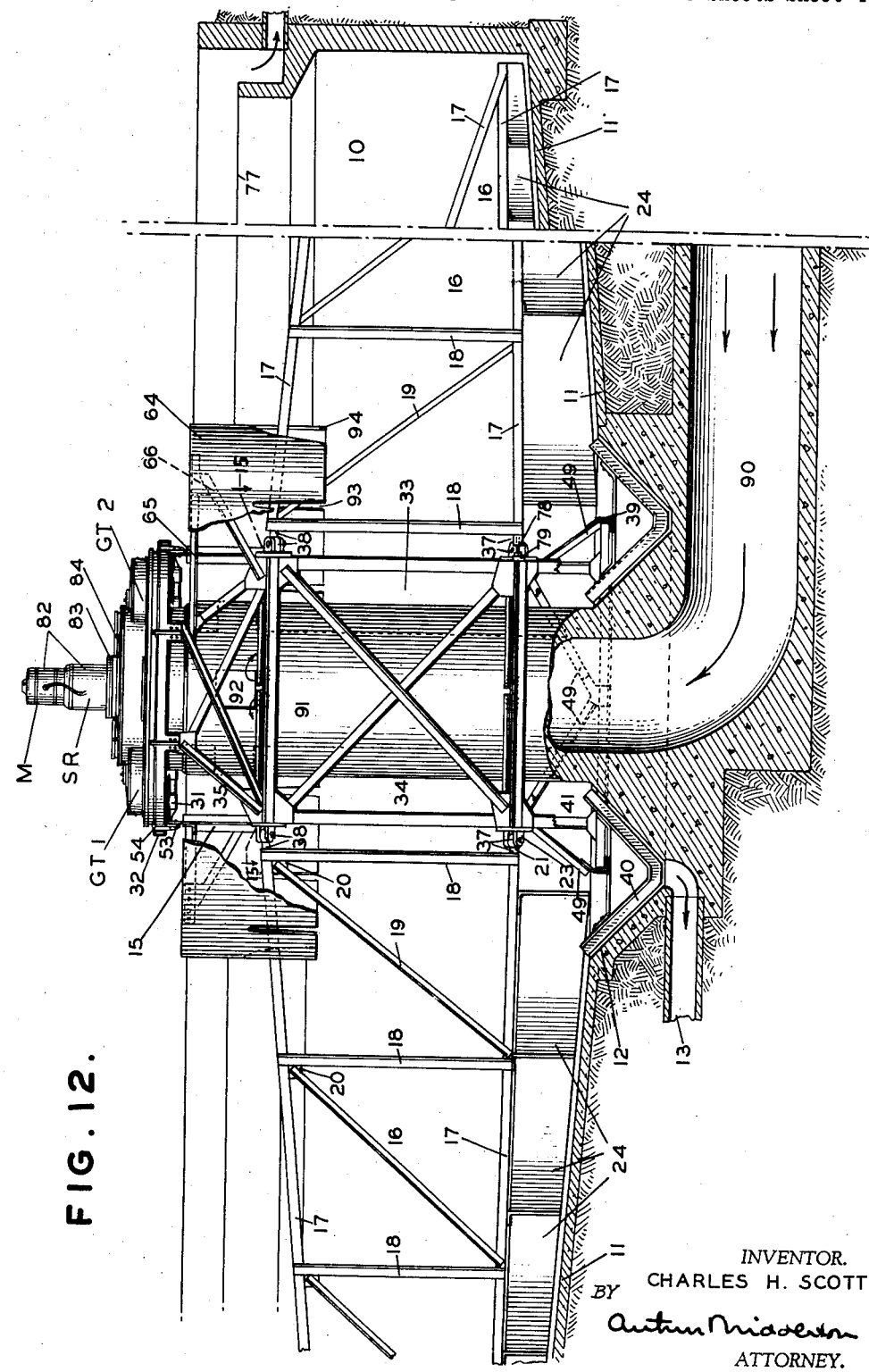

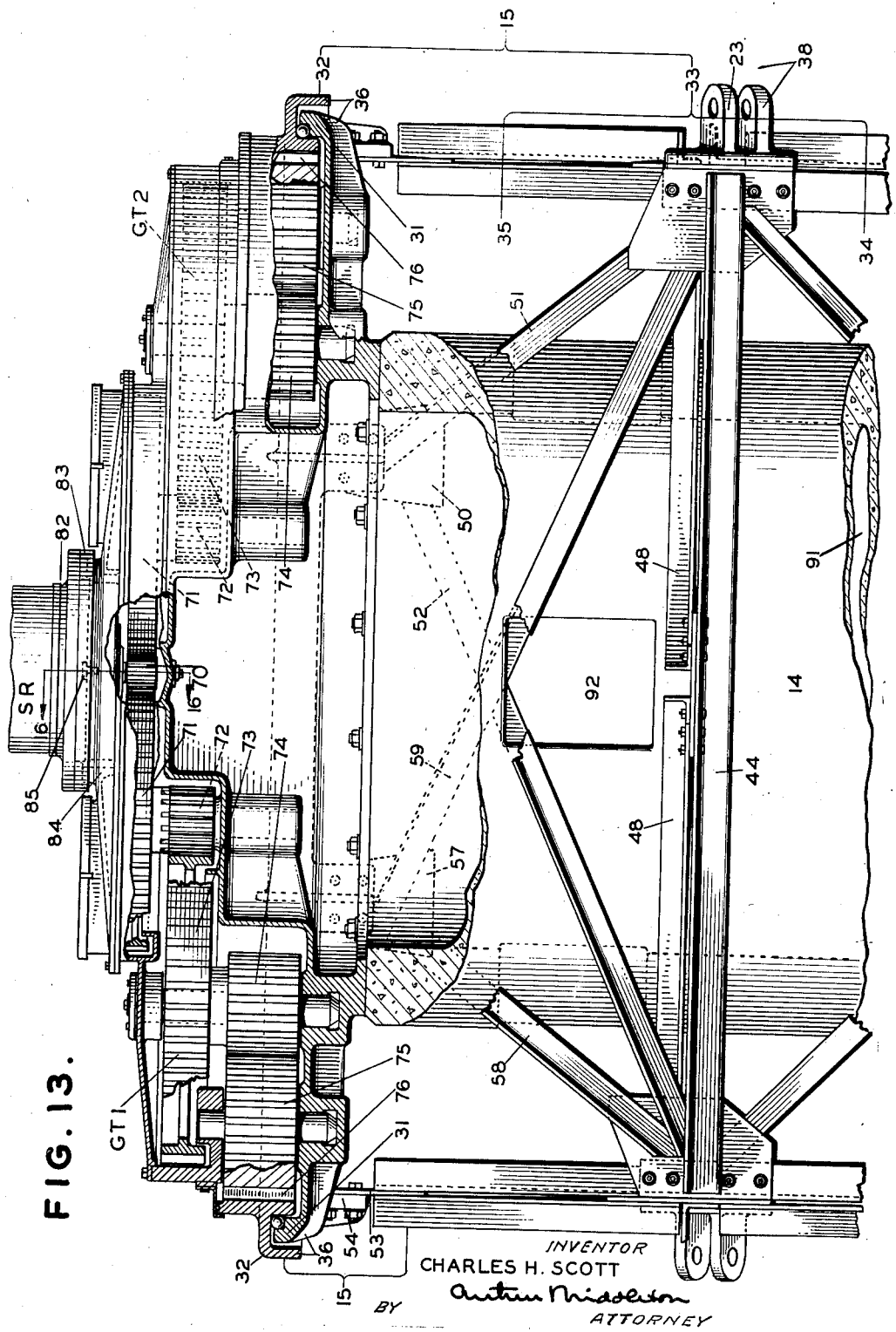

June 28, 1938.  C. H. SCOTT  2,122,384
SEDIMENTATION APPARATUS
Filed April 25, 1936   9 Sheets-Sheet 7

INVENTOR.
CHARLES H. SCOTT
BY
ATTORNEY.

June 28, 1938.　　　C. H. SCOTT　　　2,122,384
SEDIMENTATION APPARATUS
Filed April 25, 1936　　9 Sheets-Sheet 8
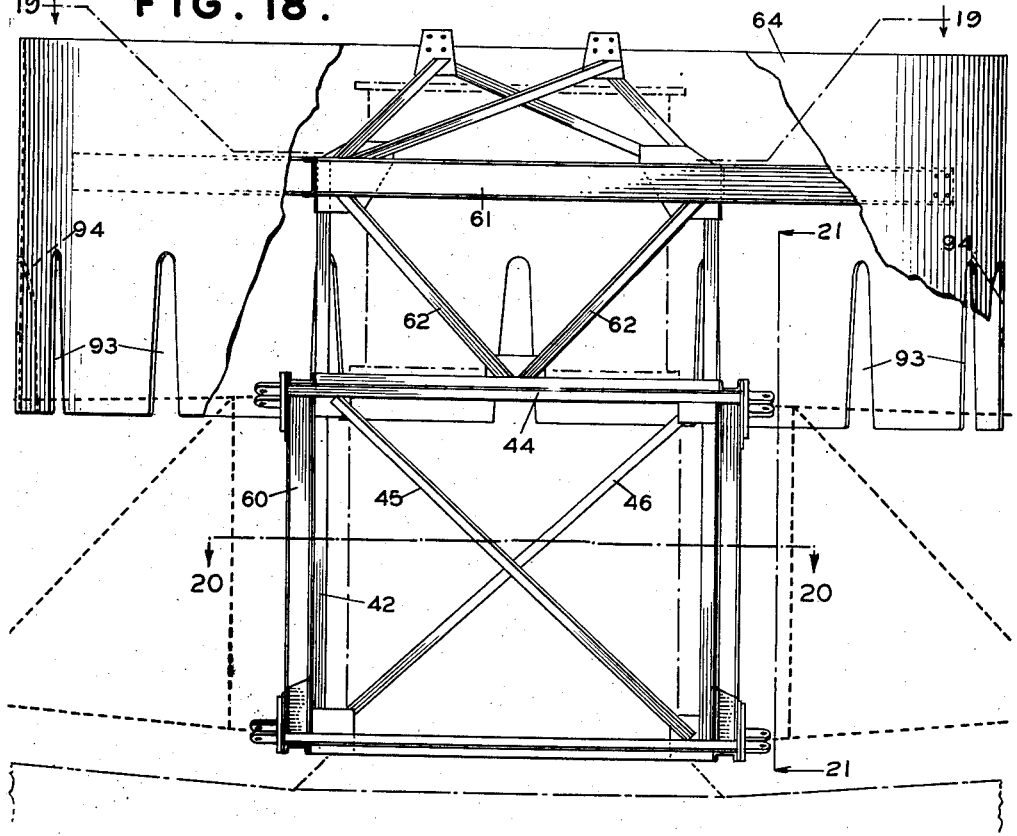
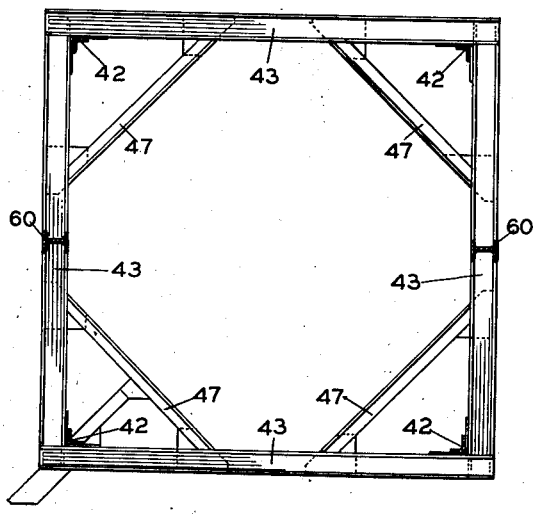
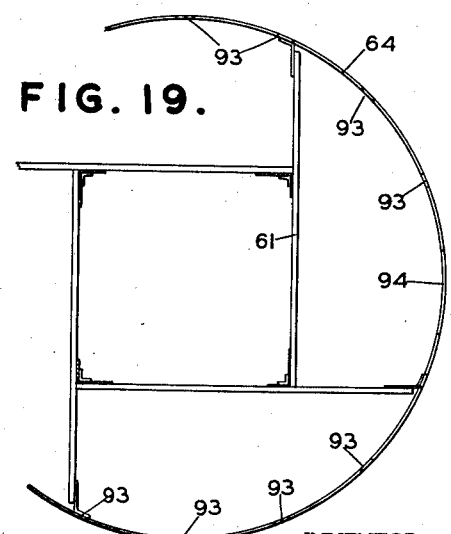
INVENTOR.
CHARLES H. SCOTT
BY
ATTORNEY.

June 28, 1938.  C. H. SCOTT  2,122,384
SEDIMENTATION APPARATUS
Filed April 25, 1936  9 Sheets-Sheet 9

INVENTOR.
CHARLES H. SCOTT
BY
ATTORNEY.

Patented June 28, 1938

2,122,384

UNITED STATES PATENT OFFICE 2,122,384

SEDIMENTATION APPARATUS

Charles H. Scott, Queens Village, N. Y., assignor to The Dorr Company, Inc., New York, N. Y., a corporation of Delaware Application April 25, 1936, Serial No. 76,349

9 Claims. (Cl. 210—55)

The present invention relates to sedimentation apparatus of the continuously-operating type and more particularly to an improved form of raking or scraping apparatus for plowing deposits of settled solids in a settling tank to discharge from the tank. Such sedimentation apparatus comprehends, for example, apparatus which is frequently referred to as clarifiers, as thickeners, or as hydro-separators, and as illustrative of the type to which the present invention is applicable attention is called to the Scott U. S. Patent 1,888,743 granted November 22, 1932, or to any foreign patent or application corresponding thereto. That patent basically illustrates the manner of mounting a horizontally-rotatable raking mechanism from a pier and the driving of such mechanism from the rotor of a motor through the medium of speed reducing and power transmission mechanism in an arrangement according to which the motor and the speed reducing mechanism derive their support from the pier.

In respect to the apparatus as disclosed in said patents or applications and also in respect to the apparatus hereof the solids after settling to form a deposit of sediment on the bottom of the tank are progressively plowed or raked toward the center of the tank and into the discharge trench or sump. This plowing operation is performed by a device comprised ordinarily of a frame mounted for rotation on a vertical axis having a plurality of rake arms extending radially outward therefrom. Attached to each of such rake arms are rakes or bladed scrapers which, as the rake arms rotate, rake or plow the sediment of settled solids slowly and step-wise toward the center of the tank.

The operation of such solids or sludge removal devices is ordinarily continuous, but conditions may arise which prevent the removal of the sludge from the tank. In such event the scraping or raking devices are kept in operation in order to prevent them from becoming embedded in the sediment or sludge which sometimes solidifies or forms an obstructing mass if it is not continuously agitated. If, for any reason, the power or rotating mechanism for the rotating arms fails and the scraping or raking devices stop their rotation sufficiently long they become stuck or embedded in the mass. Also foreign substances accidentally or otherwise introduced into the tank may offer an obstruction to the raking movement of the arm. Under such conditions it has heretofore been necessary to remove the liquid from the tank, and then to remove the obstructing mass from the tank bottom before operations could be resumed.

It is the object of my present invention to provide a raking or scraping device carrying arm which will automatically lift out of a thickened sludge bed when the power is applied thereto, or which will automatically raise should the raking or scraping blades carried on the bottom of the arms meet with an obstruction.

According to the present invention an improved formation of arm carrying structure is provided by a novel construction of horizontally-turnable framework of assembled members connected together in a skeletal construction which provides a framework that is light and rigid and which provides a formation corresponding to the inner end portion or inner end formation of the tiltable arm, or arms, of the raking mechanism. This framework has at the upper portion thereof a horizontally-turnable main bearing member from which a depending cage portion extends downwardly into the tank and which depending cage portion embodies an arm-carrying body section and an intermediate body-carrying section disposed between the body section on the one hand and the horizontally-turnable bearing member on the other hand. In the preferred form of construction this intermediate section is connected to the body section in such a manner that it permits an attachment to the turnable main bearing member in a manner whereby there is avoided the imposing of undue and awkward strains on the turnable bearing member incident to the connection being made thereto. This feature is realized because the connection of the intermediate carrying section to the body-carrying section is such as will permit lateral flexing along radial or approximately radial lines of the upper portion of the intermediate carrying section incident as and when the required connection to the horizontally-turnable main bearing member is being made.

Certain features of the invention also relate to a novel arrangement by which a balanced driving from the motor of the horizontally-turnable framework is enabled to be advantageously realized.

The invention possesses other objects and features of advantage, some of which with the foregoing will be set forth in the following description. In the following description and in the claims, parts will be identified by specific names for convenience, but they are intended to be as generic in their application to similar parts as the art will permit. In the accompanying drawings there have been illustrated the best embodiments of the invention known to me, but such embodiments are to be regarded as typical only of many possible embodiments, and the invention is not to be limited thereto.

The novel features considered characteristic of my invention are set forth with particularity in the appended claims. The invention itself, however, both as to its organization and its method of operation, together with additional objects and advantages thereof, will best be understood from the following description of a specific embodiment when read in connection with the accompanying drawings, in which:

Fig. 1 is a plan view of a settling tank, showing my device in position therein, Fig. 2 is a vertical sectional elevation of the tank shown in Fig. 1, Fig. 3 is a plan view, on an enlarged scale, of a position of a rake carrying arm, and the support on which the same is mounted, Fig. 4 is a front elevation of Fig. 3, Fig. 5 is a section on the line 5—5 of Fig. 4, Fig. 6 is a section, similar to Fig. 5, but showing a modified form of the rake carrying arm, Fig. 6A is a sectional detail view of the adjustable stop construction employed, the same being a view taken as on the horizontal plane indicated by the line 6A—6A of Fig. 4, of Fig. 5 or of Fig. 6 looking in the direction of the arrows, Fig. 7 is a diagrammatic plan illustrating the operation of my device when an obstruction in the sludge bed is encountered by the rakes or scrapers.

Figs. 8, 9, 10 and 11 in the order named and read in connection with Fig. 7, illustrate the manner in which the rake arm automatically lifts.

Fig. 12 is a view partially broken away in the main showing the settling tank construction in vertical section and the horizontally-turnable sedimented solids raking assemblage in vertical elevation. This figure and the figures hereinafter referred to are illustrative of certain refined commercial embodiments or features of apparatus wherein or with which the invention of Figs. 1 to 11 is employed.

Fig. 13 is a vertical view partially in section showing in considerable detail an improved mode of mounting the horizontally-turnable raking assemblage from the pier, and more specifically the figure shows the manner by which the horizontally-turnable framework of the raking assembly is supported from the pier through the medium of a turntable construction and also the manner in which the horizontally-turnable framework is driven from a motor through speed reducing and power transmission gear trains which collectively impart a balanced rotary drive to the framework.

Figure 17:
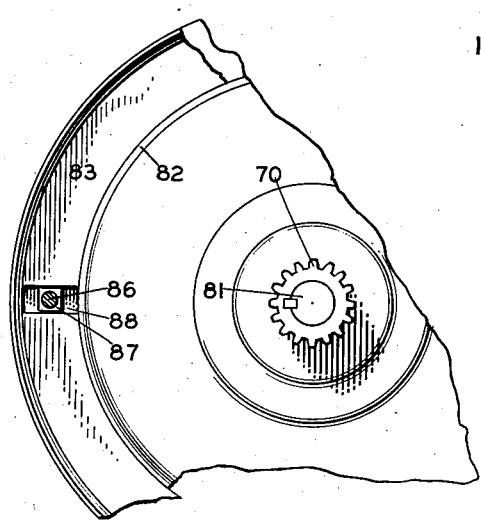
Figure 16:
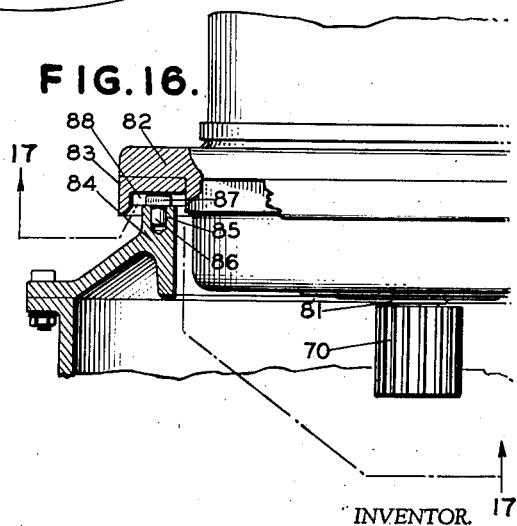

Figs. 16 and 17 collectively illustrate an adapter construction by which the combined housing for the motor and the initial speed reducing and power transmission mechanism movably associated therewith is non-rotatively but horizontally yieldably mounted on a larger or main framing that houses a plurality of larger and slower speed reducing and power transmission mechanisms—sometimes referred to as power transmission gear trains—whereby a small pinion of the initial speed reducing and power transmission mechanism has sufficient limited horizontal movement to impart balanced load or drive condition to and through the larger speed reducing and power transmission mechanisms and ultimately to the horizontally-turnable framework.

Fig. 16 is a partial vertical sectional view taken as on the plane indicated by the broken line 16—16 of Fig. 13, looking in the direction of the arrows and Fig. 17 is a partial sectional view taken as on the plane indicated by the broken line 17—17 of Fig. 16, looking in the direction of the arrows.

Fig. 18 is a side view of another form of depending cage portion and indicated in connection therewith there is shown a cylindrical feed or stilling well structure which is rotatable therewith.

Fig. 19 is a plan view illustrating the manner for supporting the cylindrical still well from the depending cage portion. This figure is at a smaller scale than Fig. 18.

Fig. 20 is a horizontal sectional view taken as on the line 20—20 of Fig. 18 looking in the direction of the arrows.

Figure 21:
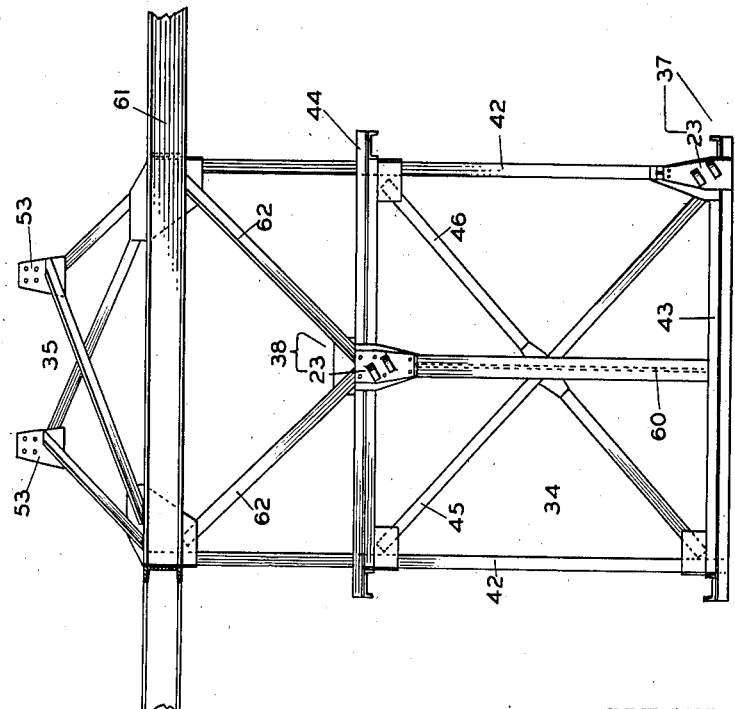

Fig. 21 may be considered as end elevation of the depending framework, the side elevator of which is shown in Fig. 18. The arm carrying hinges are to be considered as supported on and carried by the vertically extending end section.

Figure 22:
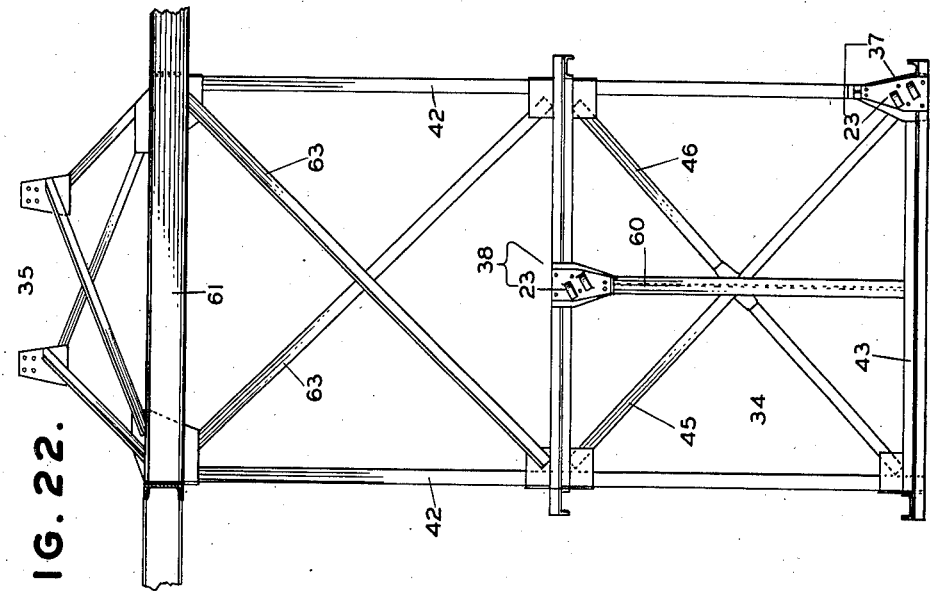

Fig. 22 is illustrative of a still further modified form of depending framework structure and is illustrative of a framework for use in a relatively deep settling tank.

Throughout the specifications and on the drawings like reference characters designate like or similarly functioning parts.

*Referring particularly to Figs. 1 to 11 inclusive*

Referring to the drawings, 10 designates a settling tank, having a sloping bottom 11, at the center of which is a discharge trench or sump 12. Communicating with the discharge 12 is an outlet pipe 13, through which sediment or sludge is removed.

Extending upwardly from the center of the bottom 11 is a pier 14, on the top of which is rotatably mounted, on a stationary main bearing member 31 providing a vertical axis, a framework 15. The framework 15 which is frequently referred to as an arm carrying member, extends downwardly into the tank 10, and has pivotally attached thereto a plurality of radially extending rake carrying arms 16. The framework 15 has at the top thereof a horizontally-turnable main bearing member 32 mounted on the stationary main bearing 31, and it also includes what may be considered as a depending cage portion 33 having a skeleton box-shaped body section 34 from which the pivoted raking arms are carried. It also includes an intermediate body carrying section 35 by which the body section 34 is carried from the horizontally-turnable main bearing member 32. The stationary main bearing member 31 and the turnable main bearing member 32 constitute a turntable construction 36 by which the framework 15 is rotatably mounted on the pier so as to depend from the plate of mounting therefor downwardly into the settling tank and so as to horizontally turn about the vertical axis provided by the bearing member 31.

The rake carrying arms 16 are preferably built in skeleton form of structural shapes, comprising the longitudinally extending members 17, tied together by the transverse members 18, diagonals 19, and gussets 20, in any approved manner. The number of longitudinals 17 may be four, as shown in Fig. 5, or three, as shown in Fig. 6. The form in which three longitudinals are employed is the preferred form. The arms 16 taper from one end to the other, and in the form where three longitudinals 17 are employed a cross section at any point along the length of the arm is in the form of a triangle, to wit, a triangle of isosceles or other suitable form. The upper portion of the triangular cross section of the arm slopes upwardly and forwardly in respect to the path of rotary movement which the arm has about the vertically extending axis referred to.

The rake-carrying arms 16 have attached thereto at diametrically opposite corners at the ends of the longitudinally extending members 17, pivoted bearing blades or hinge tongues 21 perforated as shown for the reception of hinge pins or pintles 22. Bearing blocks or carrying lugs 23 are secured to the framework, and through these bearing blocks 23 there extend the hinge pins 22 by which the rake-carrying arms 16 are tiltably or swingably mounted through the medium of the blades or hinge tongues 21. The rake-carrying arms 16 are normally rotated as a unit about the vertically extending axis by the rotating framework 15, and are independently partially rotatable, tiltable or swingable on such framework 15, to wit, about a hinge axis which is inclined so that it slopes forwardly and upwardly or, in other words, about an axis which is inclined so as to make an acute angle to a horizontal plane. On the lower forward corner of the end of the arm 16, is an adjustable stop member 78, which contacts with a block or abutment member 79 on the framework 15 to limit the swinging movement of the arm 16.

Figure 1:
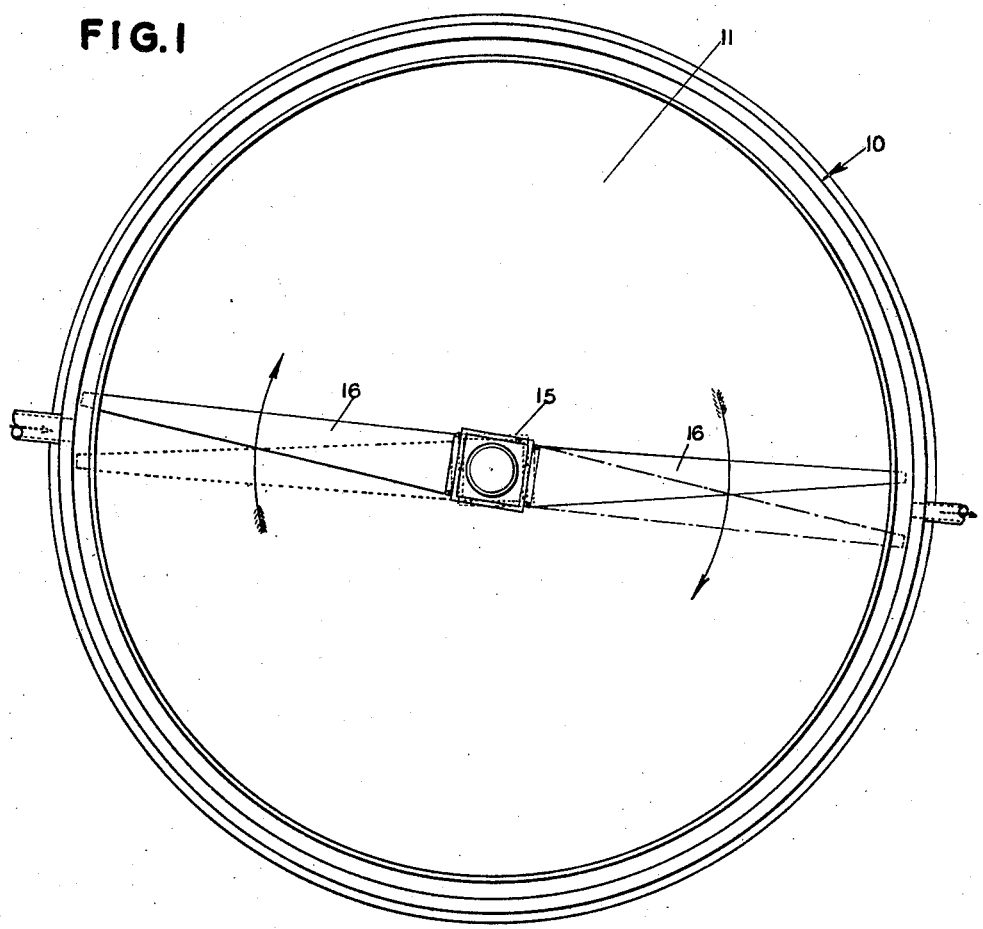

The arms 16 rotate in the direction indicated by the arrows in Fig. 1, and the rakes or scrapers 24, carried on the arms 16 are so arranged as to plow the settled solids toward the center of the tank.

The mounting of the arms 16 on the framework 15 is such that while ordinarily the arms rotate with their rakes or scrapers 24 in engagement with or close to the bottom of the tank, such arms in the event of their rakes or scrapers 24 meeting with an obstruction, will have their turning movement resolved into two components. One of such components is a lifting one tending to lift the arm so as to free the raking or scraping arms 16 by upward movement from the obstruction. The other component is in a horizontal plane. The result is, therefore, that while the arms 16 are lifted over or upward with respect to an obstruction, whereby an undue operating load in avoided, nevertheless, as the arms are repeatedly passed over and in contact with the obstruction, it is gradually worn down and ultimately removed if of such character as to be removable in this manner. If, however, the obstruction is of a relatively solid character, as a rock, the arm will ordinarily repeatedly ride thereover until the rock has been otherwise removed.

This action of my improved device is clearly illustrated in Figs. 7 to 11 inclusive. Referring to such figures, numerals 25, 26, 27 and 28 in Fig. 7, represent the positions of the arm 16 in Figs. 8, 9, 10 and 11 respectively, and such arms are assumed to be rotating about the pier 14 in the direction of the arrow. Figs. 8, 9, 10 and 11 represent consecutive adjacent sections of the tank bottom 11 over which the rake carrying arms 16 are passing and show an obstruction in the form of an agglomerated mass 29 of deposited solids. Such obstruction as just appearing in Fig. 8, reaches its maximum height in Fig. 9, tapers off in Fig. 10, and gradually disappears in Fig. 11. The arm carrying the rakes or scrapers 24 is assumed in Figs. 8, 9, 10 and 11 to be moving to the left, as indicated by the arrows.

Referring to Figs. 7 and 8, the arm 16, represented by the full line outlined in Fig. 7, is moving the rake or scraper 24 over the normal surface of the sediment bed 30 in the tank 10. As the rake 24 approaches the left of Fig. 8, the beginning of the obstruction or lump 29 is encountered. As the rake carrying arm 16 moves into the dotted line outline 26 in Fig. 7, or into the position shown in Fig. 9, the resistance offered by the obstruction or lump 29 to the passage of the rake or scraper 24 will divide the turning moment of the arm 16 into two components, a lifting and a horizontal component, with the result that the arm 16 will be rotated about the diagonally located bearing pins 22 to lift the rake or scraper 24 in the manner indicated in Fig. 9.

As the peak of the obstruction or lump 29 is passed, as indicated by the dot and short dash outlined 27 in Fig. 7 and as shown in Fig. 10, the lifting component is lessened, resulting in a corresponding lowering of the arm 16.

After the arm 16 has passed the obstruction or lump 29 as indicated by the dot and long dash line 28 in Fig. 7, and as shown in Fig. 11, the lifting component will have disappeared, and the rakes or scapers 24 now in their normal operative position will ride on and in the sediment bed 30 in the normal manner.

Figure 2:
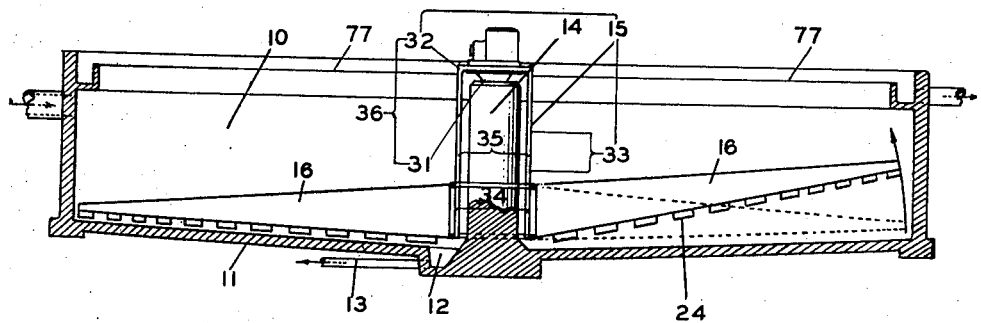

The same result is produced by the rake carrying arms 16, when the rakes 24 are embedded in a hard or deformable mass. As power is turned on to rotate the framework 15 about its vertical axis on the pier 14, the force exerted on the arm 16 tends to rotate it in a horizontal plane in the direction of the arrow shown in Fig. 1. However, the resistance offered to rotation of the arm 16 because of its being embedded in the mass, will cause the outer end of the arm 16 to move upwardly, as shown in Fig. 2 in full lines. The rake carrying arms 16 will thus "ride" themselves out of the mass in which they may be embedded.

The mechanism that includes the movable framework 15 and the rake carrying arm 16 with the raking blades 24 thereupon constitute essentially elements of what may be defined as a settled solids raking assemblage. As to the movable framework 15, the depending skeletal box-shaped body or rake arm carrying section 34 thereof extends downwardly into the body of liquid solids mixture undergoing sedimentation within the tank or basin 10.

The normal or operative level of the body of liquid undergoing sedimentation is determined by overflow launder or effluent launder sections as 11 provided at the upper portion of the tank.

The rake carrying arm is pivotally mounted on and at the lower submerged box-shaped body section 34 of the depending portion of the movable frame 15 and normally operates in submergence. The depending section of the skeletal frame 15 upon which the rake carrying arm is pivotally mounted is therefore properly referred to as a movable submerged rake arm carrying section.

The rake arm as constructed of assembled structural shapes suitably connected or tied together is of a skeleton or skeletal construction not only to attain lightness and strength, but also in order to realize a construction which can operate to perform the desired settled solids raking and conveying functions without disturbing sedimentation operations carried out within the tank. In other words, the raking construction is such that it will normally operate in undisturbing sedimentation submergence. It will be appreciated however, should an obstructing mound be sufficiently prominent or high it might cause the outer free end of the arm to temporarily extend above the normal level of the liquid within the tank, but this should be viewed as a relatively abnormal condition or situation.

The blades providing the rakes or scrapers 24 from one point of view may be considered as connected to and as depending from the skeleton arm construction 16. From another point of view the rakes or scraper blades may be considered as embodied in and as constituting a part of the skeleton arm construction and as providing depending sections functioning as sedimented solids rakes or raking means.

It will be noted that the raking blades in respect to the forward raking movement for the carrying arm therefor have rearward and lateral inclinations, specifically rearward and inward inclinations, whereby they collectively function to effect progressive impelling or plowing action tending to transfer settled solids along paths ultimately leading to sediment discharge section, to wit, the centrally disposed trench or sump 12 from which the transferred solids are hydraulically conveyed through the pipe 13.

The rake carrying arm 16 may be viewed as a truss or as a girder. It may be viewed as a cantilever pivotally mounted at the large or inner end thereof upon a depending section of the framework 15. The longitudinal extending members 17 are sometimes referred to as chords or main chord members arranged so that an upper member gradually approaches a lower chord member.

Each rake carrying arm has an upper main chord member providing what may be termed as an inner end section that is upwardly and forwardly located with respect to an inner end of a lower chord member that provides what may be termed as a lower and rearwardly positioned inner end section, this because of the fact that the inner end sections just referred to are both vertically and horizontally spaced and are arranged as indicated in respect to each other.

The hinge construction by which the rake carrying arms are supported may be considered as providing vertically and horizontally spaced hinges or hinge members 37 and 38. For each rake carrying arm there is a hinge member which is upwardly and forwardly positioned in respect to a lower and rearwardly positioned hinge member. The hinge members for a particular arm are positioned so that the pintles thereof are in alignment along a line extending downwardly and rearwardly. It will also be noted that the hinge members which are provided for each rake carrying arm and which are definable as upper forward and lower rear hinge members are located in the immediate vicinity of the inner end of the main chord member to which it corresponds.

*Particularly respecting Figs. 12 to 17 inclusive*

There has been described above in connection with Figs. 1 to 11 the basic features essential to the realizing of the advantages of the tilting arm construction in a sedimentation apparatus. However, as the commercial work in connection with this particular invention progressed, certain refinements have been developed both in relation to the structural details of the horizontal framework 15 and in relation to the driving mechanism therefor and certain of such further improved features are illustrated in and by Figs. 12 to 17 inclusive.

As to the horizontally-turnable framework 15 of the figures just referred to, it includes the horizontally-turnable main bearing member 32 (see Fig. 13) and the depending cage portion collectively designated as 33. The upper end of the depending cage portion 33 is affixed to the horizontally-rotatable main bearing member 32 whereby the latter in effect provides the top or cap portion of the framework 15. The depending cage portion 33 is shown in perspective in Fig. 14 and it includes the relative square skeleton box-shaped section 34 constituting the tiltable arm-carrying section and an intermediate body-carrying section 35 which serves as the means by which the box-shaped body section 34 is dependingly supported from the horizontally-turnable main bearing member 32. In the construction shown in Fig. 14 the depending cage portion also comprises at the lowermost end thereof a circular member which is referred to as a rake-carrying ring. The rake-carrying ring is designated by 39 and the rakes carried thereby are designated as 40. In this connection see Figs. 12, 14 and 15. The section 39 that includes ring and which is below the main body or rake arm carrying section 34 is collectively designated as 41 and is sometimes referred to as the depending rake-carrying ring section.

Figure 14:
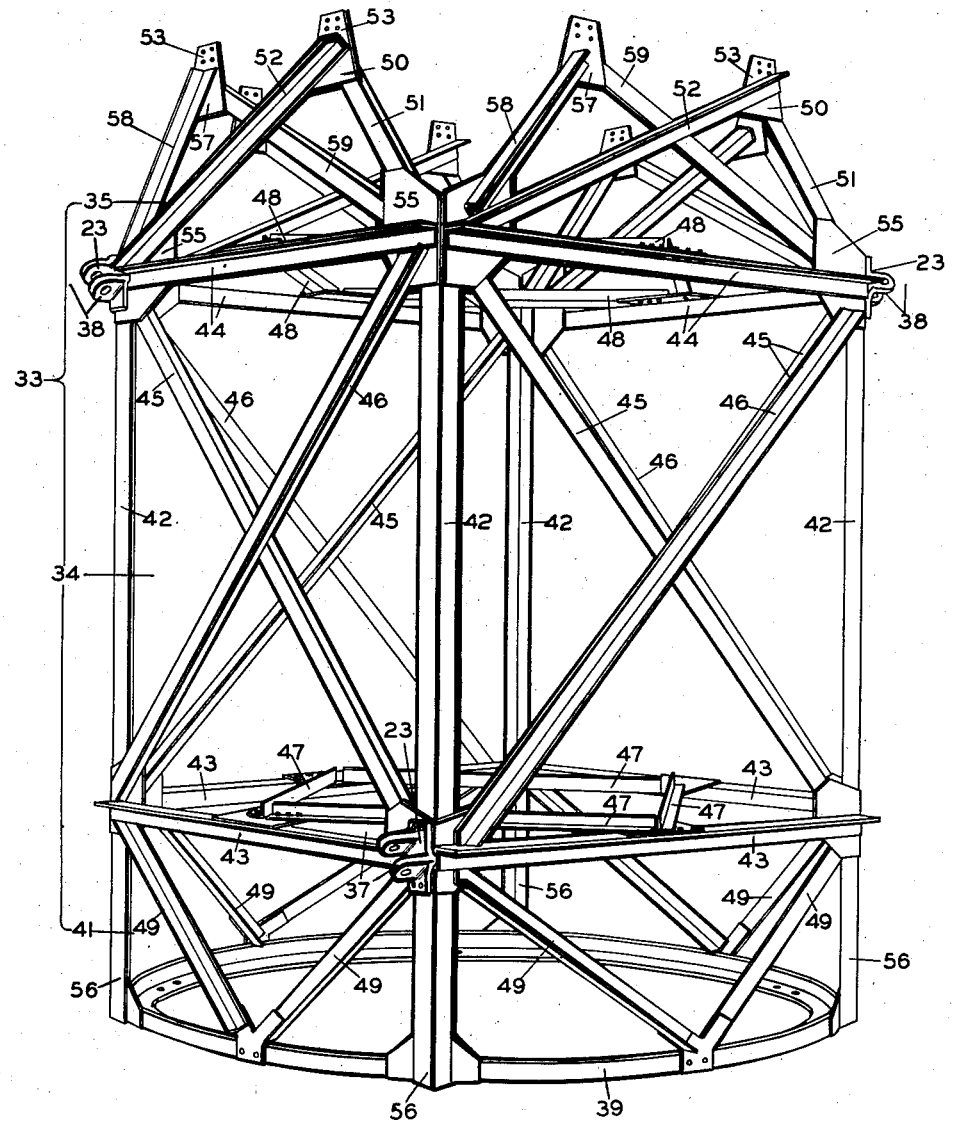
Fig. 14 is a perspective view of a depending cage portion of the framework, to wit, of a skeleton framework, which depends from the horizontally turnable bearing member of the turntable construction and which framework provides a skeleton box-shaped body section from which the raking arms are pivotally and tiltably carried.
Figure 15:
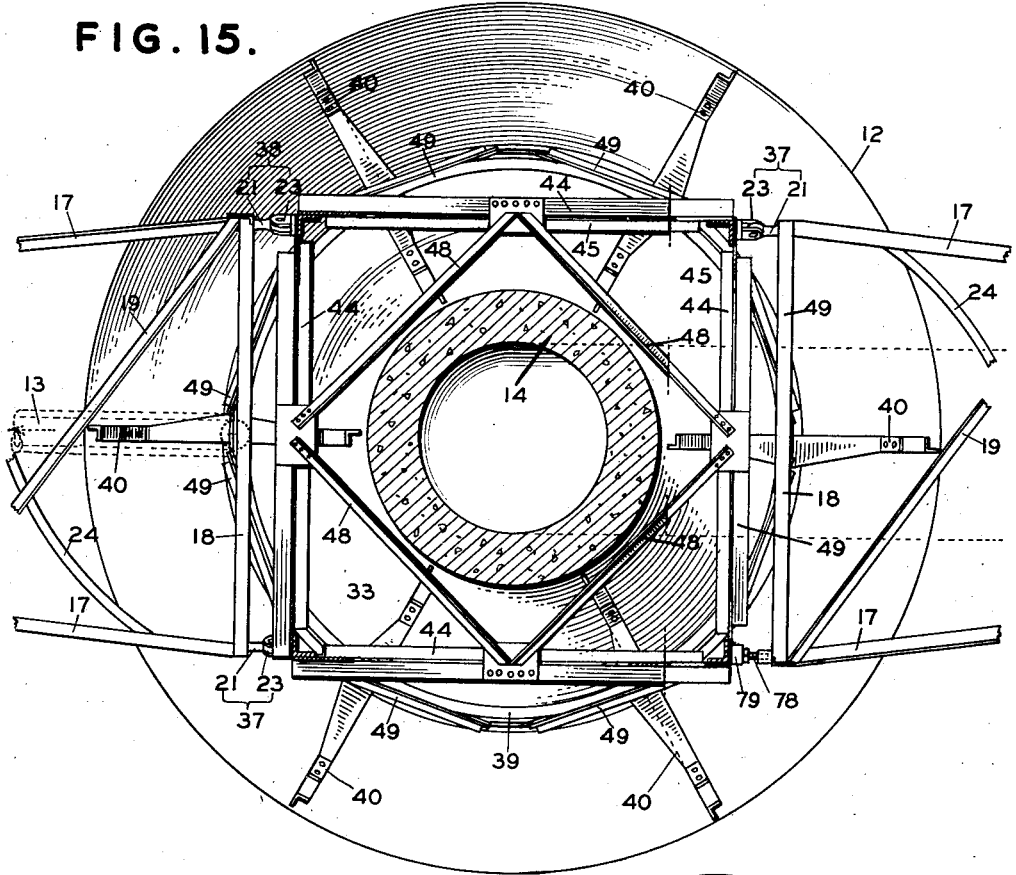
Fig. 15 is a partial horizontal sectional view of the central portion of the raking assemblage and is a partial view taken as on the plane indicated by the line 15—15 of Fig. 12, looking in the direction of the arrows.

The perspective showing of Fig. 14 brings out with exceptional clearness the employment of four vertically extending uprights or corner members 42, four lower horizontally extending tie members 43, four upper horizontally extending tie members 44, four vertically extending sets of cross-connected diagonals each of which sets includes a diagonal as 45 connected at the center thereof to a diagonal 46 crossing the same, four lower horizontally extending corner braces 47 and four upper horizontally extending corner braces 48. The parts just referred to are connected in a suitable manner as by the employment of gusset plates or otherwise into a skeleton box-like construction of relatively rigid formation and provide what has been referred to as the body section proper of the depending cage. It will be noted that the resulting structure comprises four vertically extending panels of which each corner member is common to adjacent panels. Each of the panels or panel sections comprises two corner members 42 the lower ends of which are connected by one of the lower horizontal tie members 43, the upper ends of which are connected by one of the upper horizontal tie members 44 and a set of the cross-connected diagonals that are connected into the rest of the panel structure by connections provided in localities adjacent where the horizontal tie members are connected to the upright corner members.

Rigidity is imparted to the structure as a whole and particularly to the main body section 34 thereof through the medium of the horizontally-extending upper and lower corner members or braces 47 and 48. Each lower corner member 47 connects two lower horizontal tie members 43 which are connected to a vertical corner member 42 common thereto and this connection materially braces the lower portion of the adjacent panels connected thereby and as to which the particular corner member 42 corresponds. The upper corner brace 48 likewise connects and braces the upper portion of adjacent panels or panel sections.

At this juncture it should also be noted that the bearing blocks 23 of the lower and upper hinges 37 and 38 are connected to the body section 34 at or adjacent localities where the horizontal tie members and the vertical corner members are connected.

As to the construction of the intermediate or body-carrying section 35, this comprises two sets of inverted V-shaped members for each panel, to wit, a set 57 provided by the connected leg members 58 and 59 of unequal lengths and a set 50 provided by connected leg members 51 and 52 of unequal lengths and of which the crossing longer legs 59 and 52 are preferably connected at the point of crossing in any suitable manner as by welding, bolting, riveting or otherwise. The upper ends of these V-shaped members have been provided with gusset plates 53 and are directly connected to depending tabs 54 (Fig. 13) provided on the turnable main bearing member 32. The lower ends of the legs of these inverted V-shaped carriers are connected to the main body section 34 by means including the relatively thin flat connecting plates 55. These flat plates are arranged so that they in effect parallel the vertical face of the panel to which they correspond and consequently allow, due to a flexing thereof, a limited lateral or radial deflection for the upper portion of the intermediate carrying section whereby a direct connection to the horizontally-turnable main carrying member is enabled to be realized without requiring any undue refinement of construction incident to the making and assembling of the parts. Due to the flexing of the plates there is also avoided any undue and awkward application of strains following the connection to the horizontally-turnable bearing member, and at the same time there is realized a construction by which the box-carrying member 34 is rigidly supported by and forms the horizontally-turnable main bearing member when the several intermediate carrying sections are connected thereto.

As to the depending rake-carrying ring section 41, the ring 39 thereof is directly connected to and carried by depending sections 56 of the vertical corner members 42. Intermediate sections of the ring 39, viz., the sections intermediate the connection of the corner member to the ring, are further supported and braced by inclined members 49 the upper ends of which are connected in place at localities adjacent where the lower horizontal tie members are connected to the vertical corner members 42 and which inclined members extend downwardly and outwardly to the intermediate sections of the ring 39. The rakes 40 are secured to this ring 39 in any suitable manner.

*Balanced drive for the turnable frame 15*

The essential features of construction and operation of an arrangement for effecting the balanced driving from an operating motor of a horizontally-turnable frame 15 and the raking arms carried thereon, will be readily understood from following description in connection with Figs. 12, 13, 16 and 17.

The motor for driving and horizontally turning about a vertically-extending axis the frame 15 and the raking assemblage of which the frame constitutes an essential part, is designed by M and it has directly associated therewith an initial speed reducing and power transmission mechanism "SR" of light duty type that is of high speed and relatively light in structure. The stator of the motor M and the housing for the speed reducing mechanism "SR" are directly and rigidly connected and the rotor of the motor M operates through the high speed power transmission mechanism "SR" to effect the turning of a small pinion 70 of the latter (see Fig. 13) at a slower rate or rotation than that of the rotor of the motor. The pinion 70 is the end pinion of the speed reducing train "SR".

Reference has heretofore been made to the fact that the turntable construction 36 comprises a stationary bearing member 31. This stationary member 31 with other casing members connected thereto provide the parts essential to the formation of a stationary main casing upon which the housing structure of the motor and the speed reducing mechanism "SR" are mounted.

The electric motor M and the associated high speed, light duty speed reducing and power transmission mechanism "SR" employed in the embodiment of Figures 12 and 13 are not shown or described in detail because the apparatus embodying these features are well known in the art. However, Fig. 13 clearly shows the small gear 70 which has been referred to as the last gear element or end pinion of said light duty high speed power transmission mechanism. This small gear 70 is located at and carried by the lower end of a vertically extending shaft 81. This small gear or pinion 70 has a limited horizontal floating movement and as indicated is driven in any suitable manner by speed reducing gearing leading from the rotor of the motor M. The small gear 70 is referred to as a floating gear because of the fact that the combined housing 82 for the associated stator of the motor M and the casing of the light-duty high-speed power transmission mechanism "SR" is mounted through the medium of an adapter ring 83, which may be viewed as a part of the housing or casing 82 because of being secured thereto by means of bolts or as an intermediate member interposed between the housing or casing 82 and a portion of the stationary main casing which includes the stationary turnable bearing member 31, to wit, by being secured to an ordinarily-fixed but detachably secured cover portion 84 of said stationary main casing. The adapter ring 83 rests upon the fixed cover 84 so that it is free to slide horizontally thereupon with the exception that it is restrained against rotative movement through the medium of a holding pin 85, the shank portion 86 of which pin extends into a socket in the detachably secured cover portion 84, and the head 87 of which pin enters the radially slotted portion 88 of the adapter ring 83.

Because of the adapter construction just described it will be manifest that the combined housing or casing 82 of the motor M and speed reducing mechanism SR is (a) such as to prevent the housing or casing 82 (or what is the equivalent thereof, namely, the stator of the rotor) from rotating and (b) such as to permit a slight but sufficient horizontal movement thereof as will afford the requisite floating movement for the small pinion 70 whereby it can transmit equal or proportional parts of the power or driving load to each of a plurality of like speed reducing and power transmission mechanisms respectively designed as GT1 and GT2.

Each of the gear mechanisms just referred to, that is, either GT1 or GT2 is of a relatively slow moving heavy duty type and comprises a large gear 71 that is driven by the pinion 70, a small gear 72 connected to the gear 71, so as to rotate therewith, a large gear 73 which meshes with and is driven from the small gear 72, a small gear 74 connected to the gear 73 so as to rotate therewith, and idler gear 75 which is driven by the small gear 74 and which in turn meshes with the ultimately driven main internal annular gear 76 that is integral with and that constitutes a part of the horizontally-turnable main supporting bearing member 32. Because of the limited horizontal movement of the small pinion gear 70 there is enabled to be and is automatically imparted from the gear 70 through the complementary heavy duty power transmission gear train GT1 and GT2 and ultimately to the internal annular gear 76 like or equal parts of the power load required for turning the frame 15 and the parts carried thereby. By this arrangement the turning forces are symmetrically applied to the internal driving gear in equal amounts at symmetrically arranged portions of the internal gear each of which is equally distant from the axis about which the internal gear rotates and with the result that a relatively balanced application of power is realized approaching a condition accordingly in which there is theoretically no reactive force of a horizontal or lateral character upon the main stationary bearing member.

There is an enormous speed reduction between the motor M on the one hand and the ultimately driven internal annular gear 76 on the other hand and a relatively small motor as employed imparts an effective and powerful slow turning movement to the depending framework 15 and therethrough to the tiltably mounted raking arms which are carried thereby and driven therefrom.

Respecting Figs. 18 to 21

As to the arrangement of Figs. 18 to 21 the structure of the box-shaped body portion or section 34 is fundamentally the same as that of Fig. 14. In fact, the basic principles or mechanical features embodied in the cage construction of Fig. 14 essentially exist in the depending cage construction of these figures.

Fig. 18 may be considered a side elevation, while Fig. 21 may be considered as an end elevation.

In Fig. 21 it will be noted that the hinges 37 and 38 are located so that the lowermost rear hinge is at a lower corner of the end panel of the body section 34 while the upper forward hinge 38 is at the middle portion of the panel. This location for the upper forward hinge necessitates a relatively rigid upper horizontal tie member as a carrying and supporting member for the hinge and such has been provided. Also in addition there is shown in this figure an intermediate vertical 60 to provide further support.

In order to attain greater depth or height for the frame structure an intermediate filler section or upper extension of the body section is provided between the arm carrying body portion 34 proper and the intermediate body carrying section 35, as the latter is defined by the inverted V-constructions. This upper extension or intermediate filler section is provided by an upward extension of the corner members 42 and by the addition of further horizontal tie members 61 and diagonal braces 62. There may also be employed further horizontal cross braces if additional strengthening or rigidity is sought.

Respecting Fig. 22

The arrangement of Fig. 22 is substantially the same as that of Figs. 18 to 21 except that the arrangement of Fig. 22 provides for a deeper or higher frame structure in which the intermediate filling section employs diagonal cross braces 63 instead of mere simple diagonal braces.

Stilling well

In the embodiment of the invention as illustrated in Fig. 12 there is employed a central feed. The feed shown is frequently referred to as an inverted siphon type of feed. According thereto the incoming liquid or liquid-solids mixture passes inwardly through the lower portion of the feed duct 90, thence upwardly through the upstanding section 91 thereof and finally outwardly through the discharge openings 92 leading from the upper interior portion of the pier 14.

The horizontally rotatable depending framework 15 being of skeleton formation permits a ready outward flow of the incoming liquid or liquid-solids mixture between or past the members thereof whereby the incoming feed can become distributed and passed to the surrounding interior portions of the tank. It is advisable, however, to insure an easy, gradual and relatively even distribution of the liquid or liquid-solids thus fed into the body of sedimenting liquid and to that end there is employed a centrally located substantially annular dispersing baffle or stilling well structure enclosing a space often called a feed well and which is particularly adapted to receive the incoming feed. The rotatable framework is preferably of a regular geometrical skeleton construction, as has been described, and readily adapts itself to the employment of horizontally-extending members or brace members for supporting the annular baffle that provides the stilling well. It has heretofore been pointed out that the normal level of the sedimenting liquid is determined by the effluent or overflow launders 77. These baffles are arranged so that they extend downwardly into the body of sedimenting liquid and function to slow down or still and to disperse the incoming feed into the body of sedimenting liquid in a manner to avoid any substantial turbulence or disturbance in the liquid being sedimented. It also functions to prevent any direct or short circuit flow of any sedimented feed into the effluent portions of the apparatus. Such centrally located baffle is usually annular or cylindrical and may be formed so as to provide a ring or solid, perforated or slotted material. The ring as shown in the embodiments illustrated is constructed so as to provide a relatively continuous or unperforated upper portion and a serrated or upwardly slotted lower portion. Such a cylindrical baffle as just referred to is designated as 64 and it has at the lower section thereof notched portions as 93 and 94.

In the arrangement of Fig. 12 the stilling well or dispersing baffle 64 is carried by and from the framework 15 in any suitable manner, as for example, through the medium of outwardly horizontally extending carrying members 65 and inclined braces 66, while in the instance of the arrangement of Figs. 18 to 21, or of Fig. 22, the baffle 64 is carried by extensions of the horizontal tie members 61.

In certain instances lower sections of the well structure or baffle are notched or cut out sufficiently to provide not only flow passageways, but also to provide receiving portions for the upper interior sections of the tilting rake carrying arms and such portions have been designated as 94. The notched portions designated by 93 are such as have been primarily intended as relatively restricted flow passages that aid in effecting a uniform distribution of the slowed down feed into the main body of sedimenting liquid.

The stilling-well or dispersing baffle 64 may be considered as a cylindrical feed well construction with a serrated lower edge portion by which there are provided the larger notches or notched portions 94 and the smaller notches or notched portions 93. Each of said notches is open and unobstructed at the bottom and provides a free flow passageway leading from the rear or inner face of the feed well construction to the outer or front face thereof. The height or depth of the notches in said portions 93 and 94 are shown substantially the same. As to the smaller notches 93 they are the same size and shape and they are relatively uniformly disposed. It is advisable to have the large and the small notches relatively uniformly or symmetrically disposed so as to attain a relatively uniform distribution of incoming liquid as it passes from the stilling-well or dispersing baffle 64 into the central liquid-receiving section of the sedimentation zone or tank. Since the notched portions are open at the bottom they may be viewed as self-clearing and of a type that avoids the collecting and holding of material which might otherwise catch and clog the same.

Although my invention has been described as to its use in connection with sewage treating apparatus, this is illustrative merely, as it is obvious that my invention is useful in other sedimenting operations where it is desired to rake settled solids toward an exit passage, such as in apparatus for water treatment as well as in chemical and metallurgical thickening.

Further, while my invention has been illustrated and described in connection with cylindrical sedimentation tanks, its use is not to be so limited, as obviously my invention is applicable for use in a rectangular or other shaped tank and in which the raking arm will have a rectilinear movement, as distinguished from a circular movement about a fixed center.

As the result of the particular construction or constructions herein disclosed, there is provided a raking arm which automatically raises incident to an unusual obstruction or to an unduly heavy load. The outer or free end of the arm is the section having the greatest movement away from the bottom of the sedimentation tank or basin. The section of the arm nearest the center of the tank or, in other words, nearest to its point of support, has the least amount of vertical movement from the bottom of the sedimentation tank or basin and therefore stays in a more constant position for performing its work. When the load on the arm is the greatest, this section of the arm nearest the point of support continues to perform its work. Assuming the arm has been automatically raised because of an undue load thereupon, it is to be noted that the section of the arm nearest its point of support initially performs the major portion of the work, and as it accomplishes this initial portion of the work incident to the overload, the arm progressively lowers until it ultimately assumes its normal operative position, to wit, the lowermost position therefor at which it functions to collect and transfer a normal amount of solids. This operation continues until abnormal conditions are encountered, according to which the arm will automatically raise to adjust itself to a position corresponding to the abnormal load conditions encountered thereby.

This application is a continuation in part of and embodies all of the subject matter of an application bearing Serial No. 26,532 filed by me in the U. S. Patent Office on June 14, 1935.

What is claimed is:

1. A sedimentation apparatus comprising a basin having a pier upstanding therein with a stationary bearing member mounted on the pier, and a horizontally-turnable power-driven sediment raking structure equipped with raking arms normally operable in submergence; said sediment raking structure deriving its support through the medium of a horizontally-turnable main bearing member which in turn derives its support from said stationary bearing member, and also having a framework depending from said turnable bearing member; said framework having a cage portion comprising a geometrical body section surrounding the pier and from the lower portion of which the rake arms are carried, and an intermediate body carrying section interposed between the horizontally-turnable upper bearing member and the body section; said body section having vertical corner members, upper horizontal tie members, lower horizontal tie members, sets of cross diagonals arranged in vertically extending planes, upper horizontal corner braces, and lower horizontal corner braces, all connected so that the body section results with vertical panels each including two of the vertical corner members that are connected by one of the upper and one of the lower horizontal tie members and one of the sets of cross diagonals connected into the rest of the structure of the vertical panel in the regions where the horizontal tie members are connected to the vertical corner members, the adjacent panels being braced by one of the upper and one of the lower corner braces interposed as connecting members respectively (a) between corresponding upper horizontal tie members connected to the vertical corner member common to the adjacent panels and (b) between corresponding lower tie members connected to the particular vertical corner member; said body carrying section being provided by intermediate carrying structures for and corresponding to the vertical panels, and as to each of which carrying structures an upper portion thereof is connected to the horizontally-turnable main bearing member while lower portions thereof are connected to and at horizontally-spaced sections of the upper portion of the structure of the vertical panel to which it corresponds.

2. A sedimentation apparatus as defined in and by claim 1 in which the body section of the depending framework is square in horizontal cross section thereby providing four vertical panels and also in which the body carrying section is provided by inverted V-shaped structures as to each of which the apex portion of the inverted V-structure is secured to the horizontally-turnable bearing member while the lower ends of the legs of the inverted V-shaped structure are connected by flat plates to the upper section of the vertical panel to which it corresponds.

3. A sedimentation apparatus as defined in and by claim 1 in which at least some of the raking arms are pivotally connected to the framework each through the medium of an upper front hinge and a lower rear hinge and as to which the upper front hinge is secured to the depending body section in the region where an upper horizontal tie member is connected to a vertical corner member, and the lower rear hinge is secured to the depending body section in the region where a lower horizontal tie member is connected to a vertical corner member.

4. A sedimentation apparatus as defined in and by claim 1 and in which at least one of the raking arms is a built-up construction of skeleton type formation, is in vertical transverse cross section of geometrical shape and includes a front upper longitudinal main member, a front lower longitudinal main member, a rear lower longitudinal main member, and transverse connecting members, and is pivotally connected to the body section of the framework through the medium of horizontally and vertically spaced hinges providing an upper hinge disposed between the inner end of the front upper longitudinal main member of the raking arm and a vertically extending corner member of the body section and a lower rear hinge disposed between the inner end of the lower rear longitudinal main member of the raking arm and a vertically extending corner member of the body section; and in which a stop is provided between the inner end of the front lower longitudinal main member of the raking arm and a vertically extending corner member of the body section.

5. A rake arm carrying framework for use in a sedimentation apparatus having a settling tank with an upstanding stationary pier therein upon which there is located a stationary bearing member by which the framework is turnably mounted while encircling the pier; said framework including a horizontally-turnable bearing member adapted to be mounted on a pier supported stationary bearing member; a hollow body section for encircling the pier; and an intermediate body-carrying section; said body section comprising vertical corner members, upper horizontal tie members, lower horizontal tie members, sets of diagonals, upper horizontal corner braces and lower horizontal corner braces, all connected into a unitary skeleton-like formation embodying vertical panels each comprising two of the vertical corner members that are connected by one of the upper and one of the lower horizontal tie members and a set of the diagonals arranged in vertically extending planes and connected to the rest of the structure of the panel in the regions where the horizontal tie members are connected to the vertical corner members, and in respect to which panels the adjacent ones thereof are furthermore connected and braced as to the upper portions of the panels by one of the upper horizontal corner braces that is interposed between and connected to the upper horizontal tie members that are connected to the vertical corner members common to the adjacent panels and as to the lower portions of the panels by one of the lower horizontal corner braces that is interposed between and connected to the horizontal tie members that are connected to the vertical corner member common to the adjacent panels; said intermediate body-carrying section comprising inverted V shaped intermediate carrying members arranged in sets corresponding to the vertical panels of the body section, the apex of each inverted V shaped carrying member being connected to the horizontally-turnable bearing member and the lower ends of the legs of each inverted V shaped carrying member being connected to the upper structure of the corresponding panel of the body section through the medium of flat connecting plates that in effect parallel the panel and the general plane of the legs of the inverted V shaped member.

6. A rake arm carrying framework as defined in and by claim 5, in which the framework also includes a depending raking section comprising a rake carrying ring located below the body section and connected thereto through the medium of downwardly extending portions of the vertical corner members, and also auxiliary connecting braces extending from the regions where the vertical corner members and the lower horizontal tie members are connected downwardly and outwardly to sections of the ring that are intermediate localities at which the downward extensions of the corner members are connected to the ring.

7. A sedimentation apparatus as defined in and by claim 1 in which the raking arms are hinged to the geometrical body section of the framework and in which there is also a cylindrical stilling well surrounding and rotatably carried by the framework and overlying the inner end sections of the raking arms that are carried by said framework.

8. A sedimentation apparatus as defined in and by claim 1 in which the raking arms are pivotally mounted on the geometrical body section so that the outer ends thereof can move upwardly and rearwardly and in which the framework carries a cylindrical stilling well surrounding but spaced from the cage portion of the framework and notched or cut out at sections immediately overlying the hinged arms so as to provide an entrance space for receiving certain upper sections of the arms as the outer ends of the arms move upwardly and rearwardly.

9. A sedimentation apparatus as defined in and by claim 1 and having a central feeding means leading thereto and an annular stilling well carried from and encircling a portion of the rotary arm-carrying framework and extending downwardly into the body of sedimenting liquid within the settling tank.

CHARLES H. SCOTT.